US 11,794,565 B2

(12) United States Patent
Marion

(10) Patent No.: US 11,794,565 B2
(45) Date of Patent: Oct. 24, 2023

(54) ENGINE SUPPORT SYSTEM AND METHOD

(71) Applicant: Volvo Truck Corporation, Gothenburg (SE)

(72) Inventor: Shawn Marion, Ridgeway, VA (US)

(73) Assignee: Volvo Truck Corporation, Gothenburg (SE)

(*) Notice: Subject to any disclaimer, the term of this patent is extended or adjusted under 35 U.S.C. 154(b) by 30 days.

(21) Appl. No.: 17/760,685

(22) PCT Filed: Nov. 22, 2019

(86) PCT No.: PCT/US2019/062826
§ 371 (c)(1),
(2) Date: Mar. 15, 2022

(87) PCT Pub. No.: WO2021/101573
PCT Pub. Date: May 27, 2021

(65) Prior Publication Data
US 2022/0332182 A1  Oct. 20, 2022

(51) Int. Cl.
*B60K 5/12* (2006.01)
*B25H 1/00* (2006.01)
*B66F 7/14* (2006.01)

(52) U.S. Cl.
CPC ............ *B60K 5/125* (2013.01); *B25H 1/0007* (2013.01); *B60K 5/1283* (2013.01); *B66F 7/14* (2013.01)

(58) Field of Classification Search
CPC ........ B60K 5/12; B60K 5/125; B60K 5/1283; B60K 5/1291; B66F 7/14; B25H 1/0007
See application file for complete search history.

(56) References Cited

U.S. PATENT DOCUMENTS 2,748,459 A    6/1956  Orr
2,865,585 A *  12/1958  Beyer ................. B60S 5/00
                                                    29/256

(Continued)

FOREIGN PATENT DOCUMENTS

GB        415271 A      8/1934

OTHER PUBLICATIONS

International Search Report and Written Opinion for International Patent Application No. PCT/US2019/062826, dated Jan. 16, 2020, 9 pages.

(Continued)

*Primary Examiner* — Jeffrey J Restifo
(74) *Attorney, Agent, or Firm* — Withrow & Terranova, PLLC

(57) ABSTRACT

Aspects of the disclosure relate to an engine support system and method. The engine support system includes a frame mounted engine support and at least one engine mounted coupler. The engine support includes a frame mount with a telescoping body and opposing arms to releasably engage a frame of a vehicle, and at least one jack assembly. Each jack assembly includes a collar coupled to and horizontally movable along the telescoping body, and a jack rod coupled to and vertically movable relative to the collar. The jack rod includes a ball mount configured to insert into the coupler at an underside of an engine block of the vehicle. Each jack assembly is configured to support and/or lift the engine block relative to the vehicle frame by vertical movement of the ball mount into the coupler and relative to the frame mount engaged with the vehicle frame.

20 Claims, 7 Drawing Sheets

(56) References Cited

U.S. PATENT DOCUMENTS

| | | | | |
|---|---|---|---|---|
| 3,306,601 | A | * | 2/1967 | Mitchell .............. B25H 1/0007 |
| | | | | 269/50 |
| 3,353,771 | A | * | 11/1967 | Clem .................... B60K 5/125 |
| | | | | 248/694 |
| 4,804,162 | A | * | 2/1989 | Rice ..................... F16M 11/046 |
| | | | | 248/129 |
| 4,932,628 | A | * | 6/1990 | Pacheco .................. F16M 3/00 |
| | | | | 248/676 |
| 5,372,353 | A | * | 12/1994 | West .................... B25H 1/0007 |
| | | | | 254/DIG. 16 |
| 6,120,236 | A | | 9/2000 | Smith |
| 6,122,811 | A | * | 9/2000 | Shirley .................. B25B 11/02 |
| | | | | 254/133 R |
| D856,626 | S | * | 8/2019 | Freilich ......................... D34/31 |
| 2004/0256819 | A1 | * | 12/2004 | Sorensen ............. B25H 1/0007 |
| | | | | 280/79.11 |
| 2016/0023229 | A1 | * | 1/2016 | Johnson .............. B25H 1/0007 |
| | | | | 269/152 |
| 2017/0174485 | A1 | * | 6/2017 | Vogel .................. B25H 1/0007 |
| 2019/0126460 | A1 | * | 5/2019 | Mittelstadt .......... B25H 1/0007 |
| 2022/0332182 | A1 | * | 10/2022 | Marion ..................... B66F 7/14 |

OTHER PUBLICATIONS

Extended European Search Report for European Patent Application No. 19953689.7, dated Jul. 21, 2023, 5 pages.

* cited by examiner

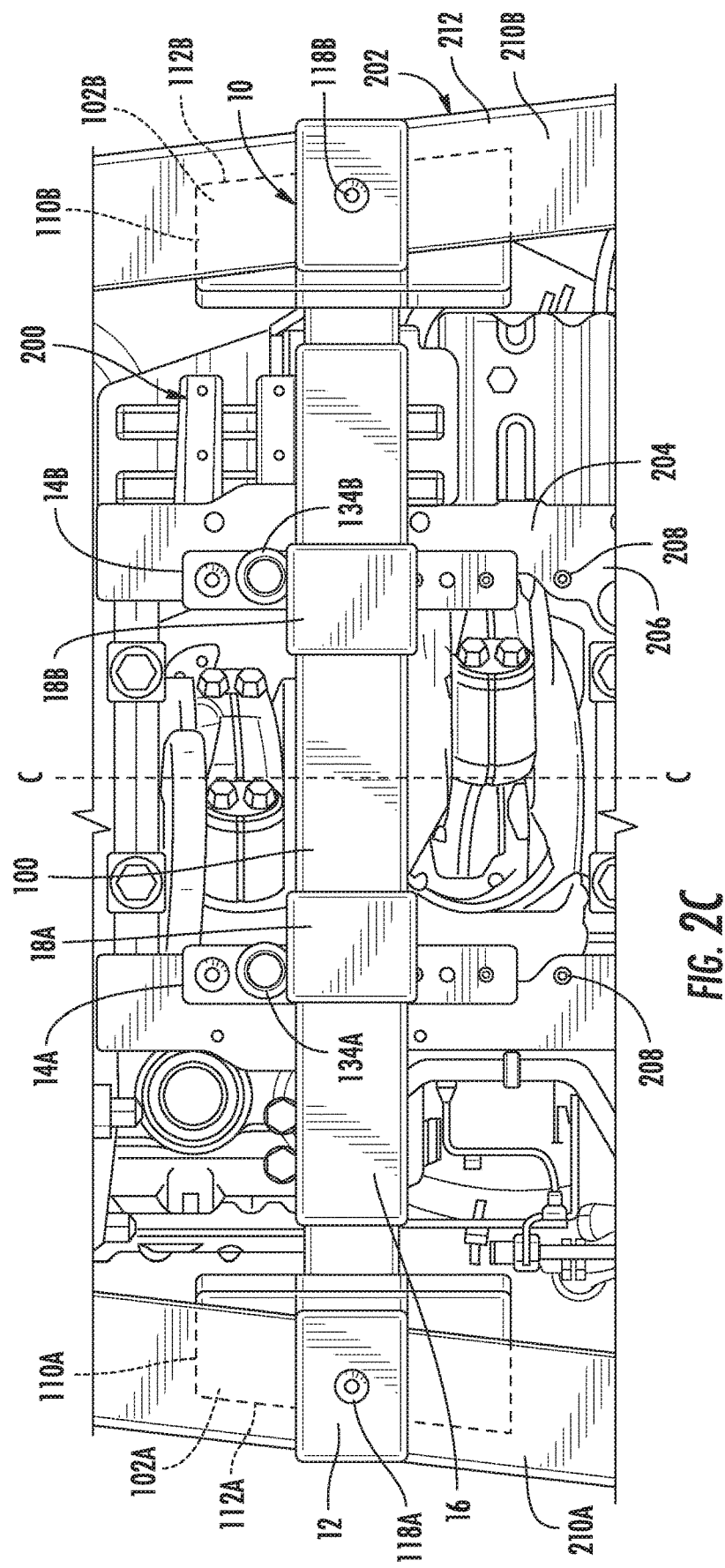

ENGINE SUPPORT SYSTEM AND METHOD

This application is a 35 USC 371 national phase filing of International Application No. PCT/US2019/062826, filed Nov. 22, 2019, the disclosure of which is incorporated herein by reference in its entirety.

FIELD OF THE DISCLOSURE

The disclosure relates generally to engine supports. In particular aspects, the disclosure relates to a frame mounted engine support system and method including a frame mounted engine support and at least one engine mounted coupler.

BACKGROUND

Vehicle engines, such as for trucking vehicles, occasionally require servicing and/or tuning to repair, maintain, or improve engine performance. Operators may require access to different portions of the engine depending on the type of work to be performed. Accordingly, operators may need a mechanical device to support and/or elevate the engine relative to a frame of a vehicle to provide sufficient access to the desired portion of the engine.

SUMMARY

According to an aspect of the disclosure, an engine support system for a vehicle includes a frame mount and a first jack assembly. The frame mount includes a telescoping body comprising at least one inner sleeve and at least one outer sleeve configured to slide axially relative to the inner sleeve, a first arm at a first end of the telescoping body configured to releasably engage a first side of a vehicle frame, and a second arm at a second end of the telescoping body opposite the first end configured to releasably engage a second side of the vehicle frame. The frame mount extends laterally (e.g., horizontally, side to side, etc.) under the vehicle engine to mount to a vehicle frame (lateral extension of the frame mount is relative to the vehicle frame). The first jack assembly includes a first collar slidably coupled to the telescoping body and configured to move horizontally along the telescoping body, and a first jack rod coupled to the first collar and configured to move vertically relative to the first collar. The first jack rod includes a body and a ball mount at an end of the body. The engine support system includes a first coupler that attaches to the engine to allow the first jack rod to engage the engine. The ball mount is configured to insert into the first coupler at an underside of an engine block of the vehicle.

In certain embodiments, the engine support system further includes that the first coupler is configured to removably attach to the underside of the engine block of the vehicle.

In certain embodiments, the first coupler is configured to removably attach to threaded holes configured to mount an oil drip pan to the underside of the engine block of the vehicle.

In certain embodiments, the first coupler defines a through hole configured to receive a fastener to removably attach the first coupler to a single threaded hole at the underside of the engine block of the vehicle.

In certain embodiments, the first coupler is fixedly attached to a plate with a plurality of through holes. At least two of the plurality of through holes are configured to align with at least two threaded holes at the underside of the engine block of the vehicle.

In certain embodiments, the at least one inner sleeve and the at least one outer sleeve each comprise a non-circular cross-section.

In certain embodiments, the telescoping body includes a first inner sleeve fixedly attached to the first arm and a second inner sleeve fixedly attached to the second arm.

In certain embodiments, the first arm includes a first flange configured to engage a first upper surface of a first rail of the vehicle frame and the second arm includes a second flange configured to engage a second upper surface of a second rail of the vehicle frame.

In certain embodiments, a first edge of the first flange of the first arm is tapered to increase a contact surface area with the first rail angled relative to a center axis of the vehicle, and a second edge of the second flange of the second arm is tapered to maximize a contact surface area with the second rail angled relative to the center axis of the vehicle.

In certain embodiments, the frame mount further includes a first clamping jaw removably attached to the first arm. The first clamping jaw includes a first bracket and a first clamping bolt. The first bracket defines a first threaded hole. The first clamping bolt is positioned in the first threaded hole and configured to move relative thereto to clamp a portion of the first rail between the first flange and the first clamping bolt. The frame mount further includes a second clamping jaw removably attached to the second arm. The second clamping jaw includes a second bracket and a second clamping bolt. The second bracket defines a second threaded hole. The second clamping bolt is positioned in the second threaded hole and configured to move relative thereto to clamp a portion of the second rail between the second flange and the second clamping bolt.

In certain embodiments, the first jack assembly is configured to lift the engine block of the vehicle relative to the vehicle frame by vertical movement of the jack rod relative to the frame mount engaged with the vehicle frame with the ball mount in the first coupler.

In certain embodiments, the body of the first jack rod is threaded.

In certain embodiments, the first jack assembly further includes a first threaded cuff attached to the first collar. The first jack rod is positioned within the threaded cuff.

In certain embodiments, the first jack assembly further includes a first threaded cuff fixedly attached to an outer surface of the first collar and offset from a center of the first collar along a center axis of the first collar.

In certain embodiments, the first collar includes a non-circular cross-section.

In certain embodiments, the first jack assembly is configured to engage the first coupler at a first side of the engine block of the vehicle. The engine support system further includes a second jack assembly configured to engage a second coupler at a second side of the engine block of the vehicle. The second jack assembly includes a second collar slidably coupled to the telescoping body and configured to move horizontally along the telescoping body, and a second jack rod threadably coupled to the second collar and configured to move vertically relative to the second collar. The second jack rod includes a second body and a second ball mount at an end of the second body. The second ball mount is configured to insert into the second coupler at the underside of the engine block of the vehicle.

According to another aspect of the disclosure, a method of supporting an engine of a vehicle includes suspending a frame mount of an engine support system across a frame of a vehicle beneath an engine block of the vehicle by moving a first arm attached to a first end of a telescoping body relative to a second arm attached to a second end of the telescoping body to an engaged orientation. The method further includes horizontally sliding a first collar of a first jack assembly of the engine support system along the telescoping body to align a ball mount of a first jack rod of the first jack assembly with a first coupler at an underside of the engine block of the vehicle. The method further includes supporting an engine of the vehicle relative to the vehicle frame by vertically moving the first jack rod of the first jack assembly to insert the ball mount of the first jack rod of the first jack assembly into the first coupler at the underside of the engine block.

In certain embodiments, the method further includes lifting an engine of the vehicle relative to the vehicle frame by continued vertical movement of the first jack rod of the first jack assembly.

In certain embodiments, the method further includes attaching the first coupler to the underside of the engine block of the vehicle.

In certain embodiments, the method further includes attaching a first clamping jaw to the first arm to position a portion of a first rail of the vehicle frame between a flange of the first arm and a first bracket of the first clamping jaw. The method further includes rotating a first clamping bolt in a first threaded hole of the first bracket of the first clamping jaw to clamp the portion of the first rail of the vehicle frame between the first flange and the first clamping bolt.

In certain embodiments, the method further includes horizontally sliding a second collar of a second jack assembly of the engine support system along the telescoping body to align a ball mount of a second jack rod of the second jack assembly with a second coupler at the underside of the engine block of the vehicle. The method further includes engaging the second jack assembly with the engine block by vertically moving the second jack rod of the second jack assembly to insert the ball mount of the second jack assembly into the second coupler of the engine block. The method further includes supporting the engine of the vehicle relative to the vehicle frame by vertically moving the second jack rod of the second jack assembly to insert the ball mount of the second jack rod of the second jack assembly into the second coupler at the underside of the engine block.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary, and are intended to provide an overview or framework for understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2C is a bottom view of the engine support system of FIG. 2A illustrating increased surface area contact between the engine support system and the vehicle frame by tapered edges of flanges of the engine support system.

DETAILED DESCRIPTION

Figure 1A:
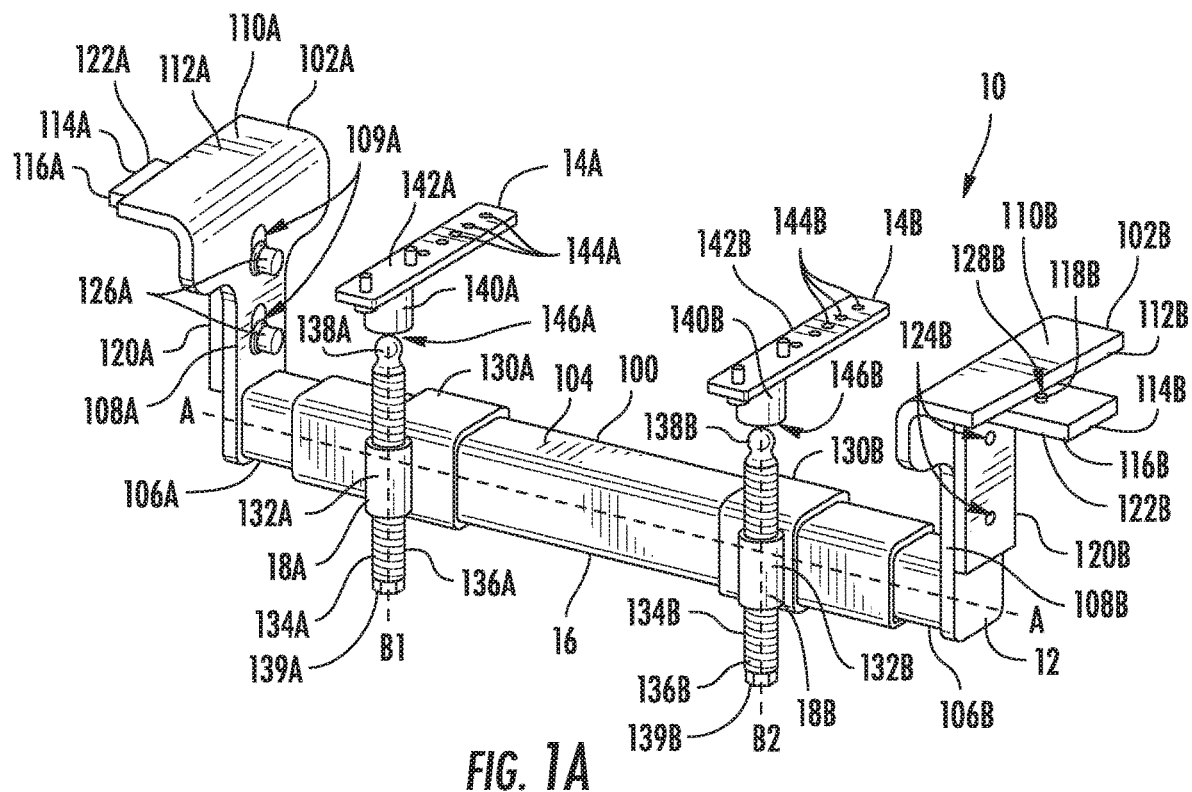
FIG. 1A is a perspective view of an engine support system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1B:
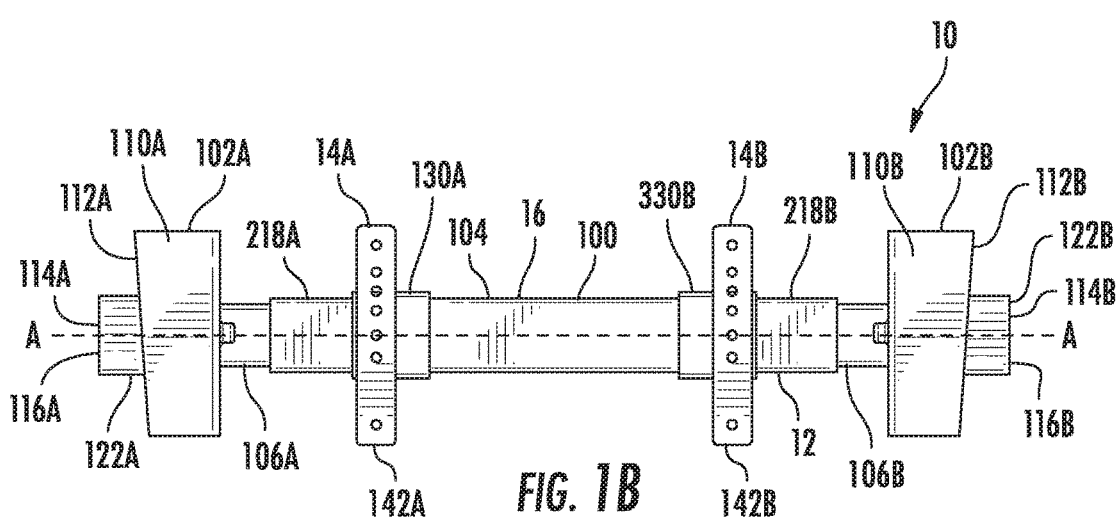
FIG. 1B is a top view of the engine support system of FIG. 1A.
Figure 1C:
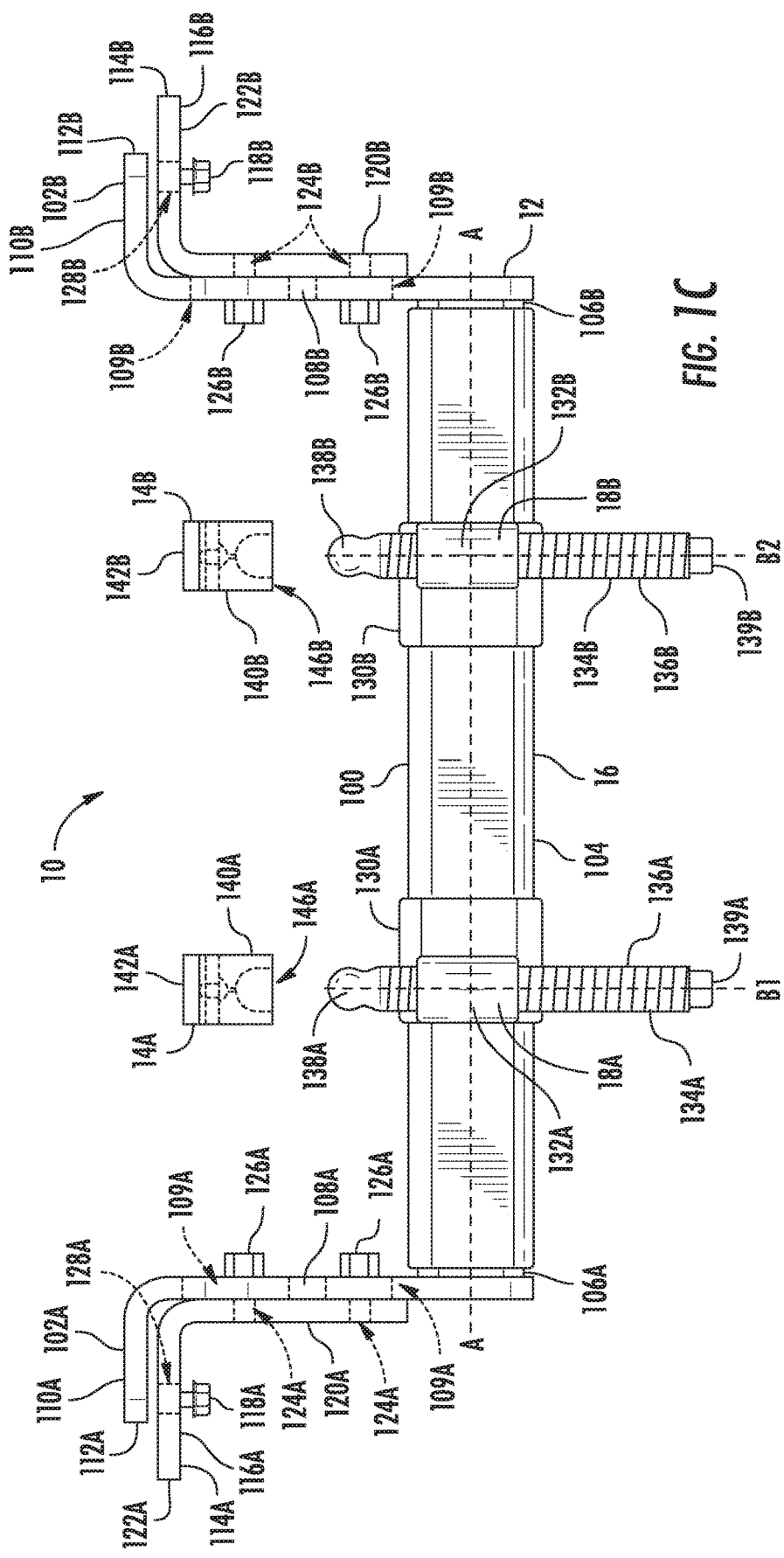
FIG. 1C is a side view of the engine support system of FIG. 1A.

FIGS. 1A-1C are views of an engine support system 10. The engine support system 10 includes an engine support 12 and two couplers 14A, 14B. The engine support 12 includes a frame mount 16, a first jack assembly 18A movably attached to the frame mount 16, and a second jack assembly 18B movably attached to the frame mount 16. The frame mount 16 includes a telescoping body 100, a first arm 102A at a first end of the telescoping body 100, and a second arm 102B at a second end of the telescoping body 100 opposite the first end.

The telescoping body 100 includes an outer sleeve 104 (may also be referred to as an outer center sleeve, outer tube, etc.), a first inner sleeve 106A (may also be referred to as a first inner tube, etc.) fixedly attached (e.g., integrally) to the first arm 102A, and a second inner sleeve 106B (may also be referred to as a second inner tube, etc.) fixedly attached (e.g., integrally) to the second arm 102B. The first inner sleeve 106A moves relative to the outer sleeve 104 along a common axis A, and the second inner sleeve 106B moves relative to the outer sleeve 104 along axis A. In certain embodiments, the telescoping body 100 only includes one outer sleeve (e.g., attached to the first arm 102A) and one inner sleeve (e.g., attached to the second arm 102B).

The first inner sleeve 106A and the second inner sleeve 106B are at least partially inserted into the outer sleeve 104. The outer sleeve 104 is configured to slide (e.g., axially translatable) relative to the inner sleeves 106A, 106B. In certain embodiments, the outer sleeve 104, the first inner sleeve 106A, and the second inner sleeve 106B have corresponding non-circular cross-sections (e.g., rectangular cross-section, square cross-section, etc.) to prevent relative rotation between the outer sleeve 104 and the inner sleeves 106A, 106B. Such a configuration ensures vertical alignment of the first arm 102A, second arm 102B, first jack assembly 18A, and/or second jack assembly 18B. This relative alignment facilitates ease of use by an operator in mounting to the vehicle frame and engaging couplers 14A, 14B mounted to the underside of an engine block of the engine.

The first arm 102A at the first end of the telescoping body 100 is configured to releasably engage a first side (e.g., first rail) of a vehicle frame of the vehicle. The first arm 102A includes a first vertical portion 108A extending upward from the first inner sleeve 106A defining one or more slots 109A. The first arm 102A further includes a first flange 110A outwardly extending from a top of the first vertical portion 108A. The first flange 110A is configured to engage the first rail of the vehicle frame. The first flange 110A includes a first edge 112A, which is tapered (e.g., from a front to a back) to provide a maximum contact surface area when the first rail is angled relative to a center axis of the vehicle.

In certain embodiments, a first clamping jaw 114A is removably attached to the first arm 102A. The first clamping jaw 114A applies a compressive force on the first rail. The first clamping jaw 114A includes a first bracket 116A and a first clamping bolt 118A. In particular, the first bracket 116A includes a vertical portion 120A and a horizontal portion 122A. The vertical portion 120A includes one or more threaded holes 124A to receive fasteners 126A inserted through the slots 109A of the first arm 102A to attach the first clamping jaw 114A to the first arm 102A. The slots 109A of the first arm 102A allow for vertical movement of the first clamping jaw 114A relative to the first arm 102A to accommodate frame rails having flanges of varying thicknesses. The horizontal portion 122A includes a threaded hole 128A to receive the first clamping bolt 118A therein. The first clamping bolt 118A is configured to move relative to the horizontal portion 122A of the first bracket 116A to clamp a portion of the first rail between the first flange 110A and the first clamping bolt 118A.

It is noted that "horizontal" (or "lateral") and "vertical" in this context generally refers to a directional orientation relative to a vehicle or vehicle frame. In particular, "horizontal" (or "lateral") and "vertical" may refer to a directional orientation of the engine support system 10 and/or components thereof (e.g., engine support 12, couplers 14A, 14B, etc.) when applied or being applied to the vehicle frame. For example, "horizontal" (or "lateral") may refer to an orientation side to side and/or front to back relative to a vehicle (e.g., vehicle frame), and "vertical" may refer to an orientation top to bottom relative to a vehicle (e.g., vehicle frame).

The second arm 102B at the second end of the telescoping body 100 is configured to releasably engage a second side (e.g., second rail) of the vehicle frame of the vehicle. In certain embodiments, a second clamping jaw 114B is removably attached to the second arm 102B. The second arm 102B and the second clamping jaw 114B include similar features as the first arm 102A and the first clamping jaw 114A and are accordingly similarly numbered.

The first jack assembly 18A includes a first collar 130A, a first threaded cuff 132A, and a first jack rod 134A. The first collar 130A is slidably coupled to and positioned over the telescoping body 100 (e.g., the outer sleeve 104) and movable (e.g., laterally, horizontally, side to side, etc.) relative thereto along axis A. The first collar 130A includes a non-circular cross-section (e.g., rectangular cross-section, square cross-section, etc.) corresponding to the outer sleeve 104 to prevent relative rotation between the first collar 130A and the outer sleeve 104. As noted above, such a configuration ensures vertical alignment of the first jack assembly 18A.

The first threaded cuff 132A is attached to an outer side surface of the first collar 130A. The axis B1 of the first threaded cuff 132A is perpendicular to the axis A of the first collar 130A. In certain embodiments, the first threaded cuff 132A is offset from a center of the first collar 130A along axis A of the first collar 130A. These features provide more variability for mounting to the telescoping body 100 and for accommodating different types of engines and/or vehicles.

The first jack rod 134A is positioned within the first threaded cuff 132A and vertically movable (e.g., translatable) relative thereto. In this way, the first jack rod 134A is coupled to the first collar 130A and configured to move vertically relative to the first collar 130A. The first jack rod 134A includes a threaded body 136A, a ball mount 138A at a top end of the threaded body 136A, and a hex cap 139A at a bottom end of the threaded body 136A. The hex cap 139A is configured to provide a feature for a tool to engage the first jack rod 134A to rotate the first jack rod 134A. Accordingly, rotation of the first jack rod 134A rotates and vertically translates the first jack rod 134A relative to the first threaded cuff 132A and the first collar 130A. The first jack assembly 18A is configured to engage the first coupler 14A at a first side of the engine block of the vehicle, such as by insertion of the ball mount 138A into the first coupler 14A at an underside of the engine block of the vehicle. The first jack assembly 18A is configured to engage the first coupler 14A to support and/or lift the engine of the vehicle.

The second jack assembly 18B includes a second collar 130B, a second threaded cuff 132B, and a second jack rod 134B. The second jack assembly 18B includes similar features as the first jack assembly 18A and is accordingly similarly numbered. The second collar 130B is configured to move (e.g., translate) along axis A of the telescoping body 100 (e.g., independent of the first collar 130A).

The axis B2 of the second threaded cuff 132B is perpendicular to the axis A of the second collar 130B. The second jack assembly 18B is configured to engage the second coupler 14 at a second side of the engine block of the vehicle, such as by insertion of the ball mount 138B into the second coupler 14B at an underside of the engine block of the vehicle. The second jack assembly 18B is configured to engage the second coupler 14B to support and/or lift the engine of the vehicle.

The first coupler 14A is configured to removably attach to the underside of the engine block of the vehicle. In certain embodiments, the first coupler 14A includes a receptacle 140A fixedly attached to a plate 142A with a plurality of through holes 144A defined in the plate 142A. The plurality of through holes 144A are configured to accommodate different types of engine blocks which may have differently spaced holes. In other words, at least two of the plurality of through holes 144A of the plate 142A are configured to align with at least two threaded holes at the underside of the engine block of the vehicle. The receptacle 140A includes an opening 146A configured to receive the ball mount 138A of the first jack rod 134A.

The second coupler 14B includes similar features as the first coupler 14A and is accordingly similarly numbered.

It is noted that the components of the engine support system 10 could be made of steel and fastened together using any of a variety of attachments (e.g., bolts, welding, etc.).

Figure 2A:
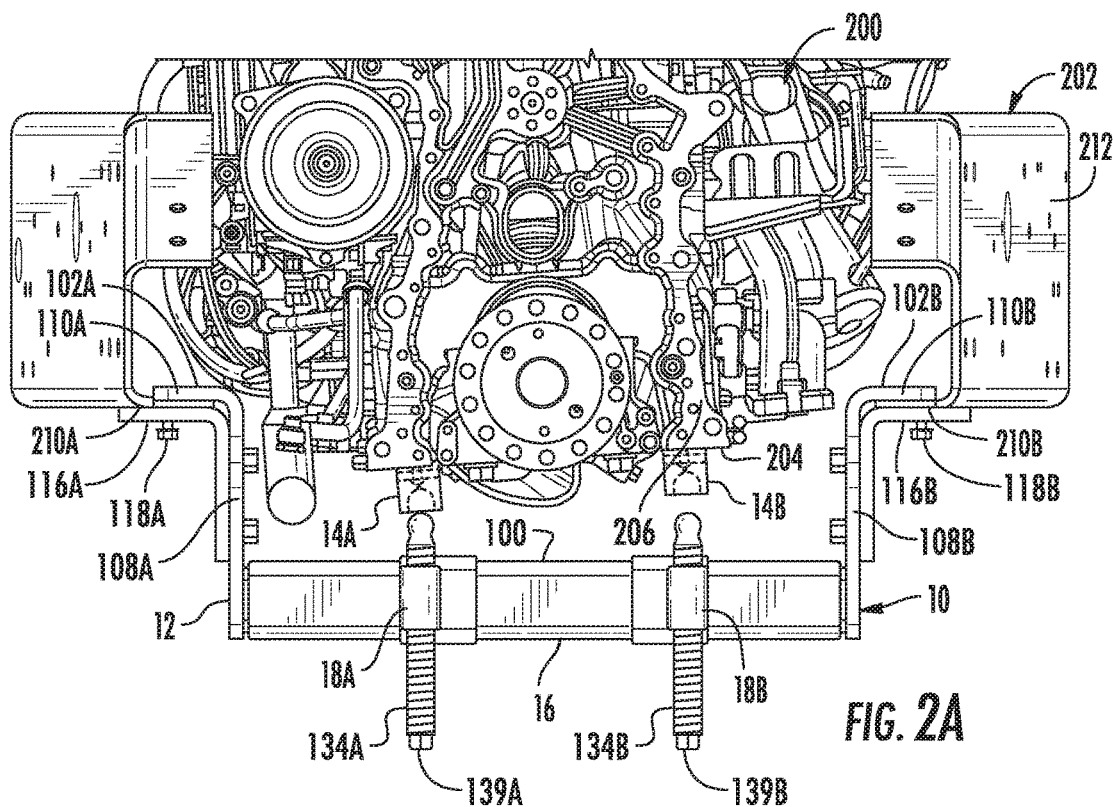
FIG. 2A is a side view of the engine support system of FIGS. 1A-1C illustrating jack rods of jack assemblies of the engine support system aligned with and disengaged from couplers mounted to the engine.
Figure 2B:
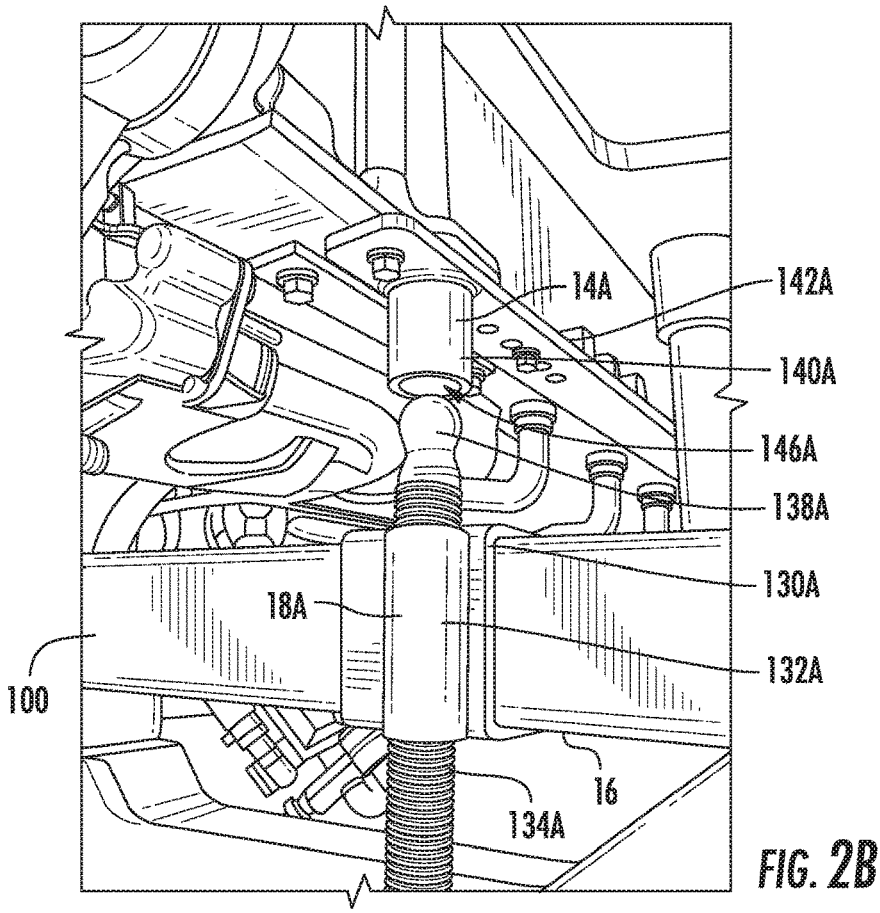
FIG. 2B is a perspective view of the engine support system of FIG. 2A illustrating one of the jack rods aligned with and disengaged from one of the couplers.

FIGS. 2A-2E are views illustrating use of the engine support system 10 of FIGS. 1A-1C to support and/or lift an engine 200 of the vehicle 202. FIG. 2A is a side view of the engine support system 10 illustrating jack rods 134A, 134B of jack assemblies 18A, 18B of the engine support system 10 aligned with and disengaged from the couplers 14A, 14B mounted to the engine 200. In particular, to use the engine support system 10, the oil drip pan is removed from the underside 204 of the engine block 206. Referring to FIGS. 2A and 2B, the couplers 14A, 14B are then mounted to the threaded holes 208 (see e.g., FIG. 2C) at the underside 204 of the engine block 206 that were used for attachment of the oil drip pan.

Referring to FIG. 2A, the telescoping body 100 is extended or retracted so that the first flange 110A rests on the first rail 210A of a vehicle frame 212 of the vehicle 202, and the second flange 110B rests on the second rail 210B of the vehicle frame 212 of the vehicle 202 with the telescoping body 100 positioned beneath the engine 200. Further, the frame mount 16 is positioned along a length of the vehicle 202 so that the horizontal path of the jack rods 134A, 134B is aligned with the couplers 14A, 14B along the length of the vehicle 202.

To secure the frame mount 16 along the length of the vehicle 202, the first bracket 116A is mounted to the first vertical portion 108A of the first arm 102A and moved vertically toward the first rail 210A. The first clamping bolt 118A is then moved vertically to apply or increase the clamping pressure applied to the first rail 210A (i.e., between the first flange 110A and the first clamping bolt 118A). Similarly, the second bracket 116B is mounted to the second vertical portion 108B of the second arm 102B and moved vertically toward the second rail 210B. The second clamping bolt 118B is then moved vertically to apply or increase the clamping pressure applied to the second rail 210B (i.e., between the second flange 110B and the second clamping bolt 118B).

Referring to FIGS. 2A and 2B, once the frame mount 16 is secured along a length of the vehicle 202, the first collar 130A of the first jack assembly 18A is slid horizontally along the telescoping body 100 to align the first jack rod 134A with the first opening 146A of the first receptacle 140A of the first coupler 14A. Further, the second collar 130B of the second jack assembly 18B is slid horizontally along the telescoping body 100 to align the second jack rod 134B with the second opening 146B of the second receptacle 140B of the second coupler 14B. It is noted that the offset of the jack rods 134A, 134B relative to the collars 130A, 130B means that the collars 130A, 130B could be disassembled from the telescoping body 100 and re-assembled so that the relative position of the first jack assembly 18A is switched with that of the second jack assembly 18B. In other words, in one orientation the jack rods 134A, 134B are positioned farther apart, and in a second orientation the jack rods 134A, 134B are positioned closer to one another, even though the respective collars 130A, 130B are in the same position on the telescoping body 100. Further, positioning of the jack rods 134A, 134B on outer side surfaces of the collars 130A, 130B provides an additional orientation for mounting. In other words, for example, in one orientation the first flange 110A is engaged with the first rail 210A and in another orientation the first flange 110A is engaged with the second rail 210B. Such asymmetries increase the modularity of the engine support system 10 to accommodate different types of engines and/or different types of vehicles.

Referring to FIG. 2C, the first rail 210A and the second rail 210B are angled relative to a center axis C of the vehicle 202. The first flange 110A includes a first edge 112A, which is tapered (e.g., from a front to a back) to increase a contact surface area with the first rail 210A, and the second flange 110B includes a second edge 112B, which is tapered (e.g., from a front to a back) to provide a maximum contact surface area with the second rail 210B.

Figure 2D:
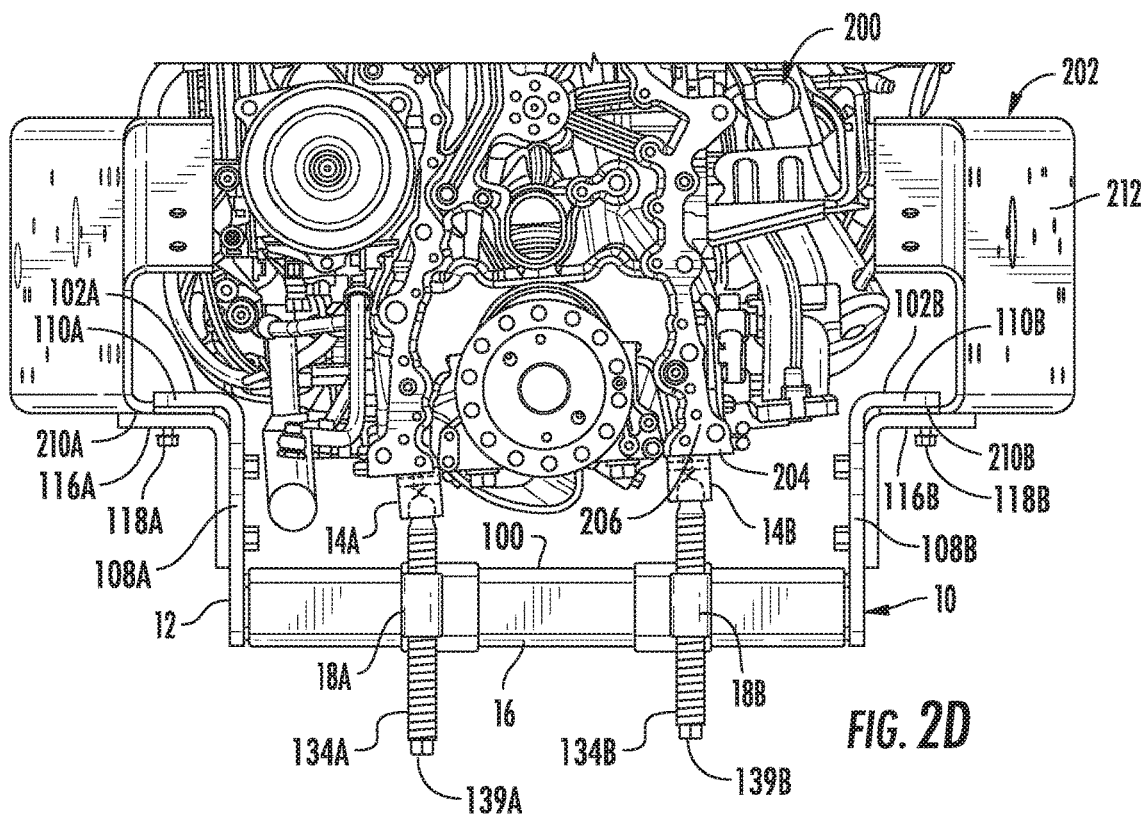
FIG. 2D is a side view of the engine support system of FIG. 2A illustrating jack rods engaged with the couplers.
Figure 2E:
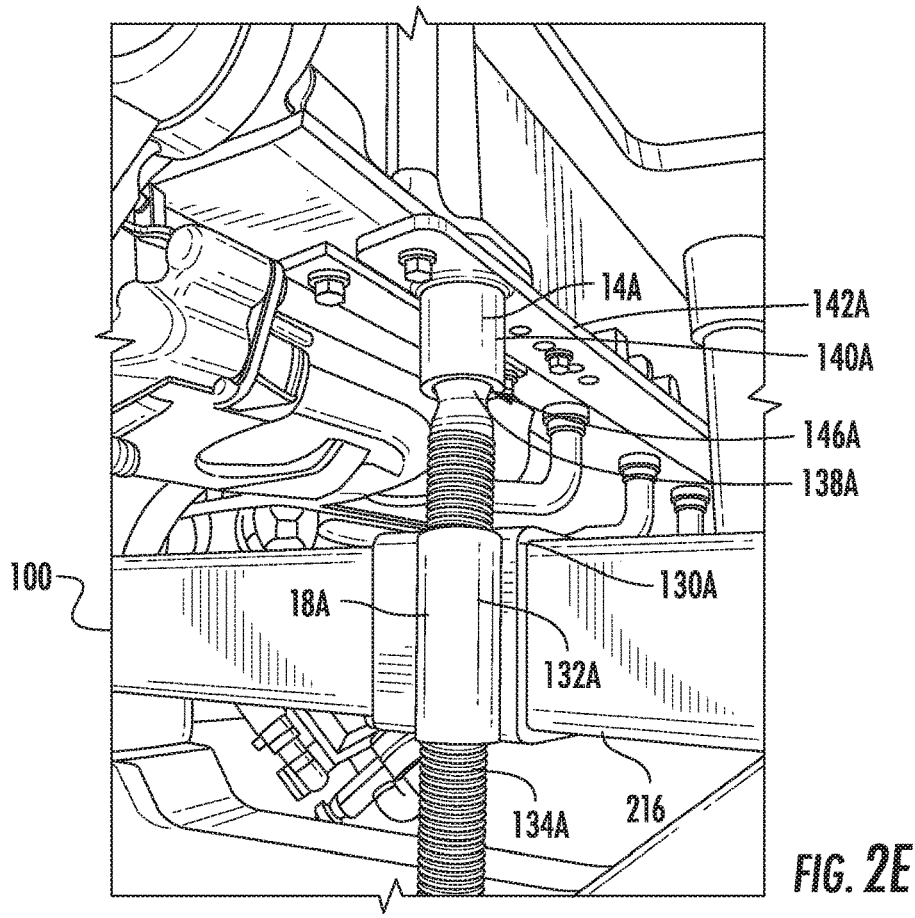
FIG. 2E is a perspective view of the engine support system of FIG. 2A illustrating one of the jack rods engaged with one of the couplers.

Referring to FIGS. 2D-2E, once the jack rods 134A, 134B of the jack assemblies 18A, 18B are aligned with the openings 146A, 146B of the couplers 14A, 14B, a tool engages the hex caps 139A, 139B of the jack rods 134A, 134B to rotate the jack rods 134A, 134B and move the jack rods 134A, 134B vertically relative to the collars 130A, 130B and cuffs 132A, 132B until the ball mounts 138A, 138B are inserted into the openings 146A, 146B of the receptacles 140A, 140B. The spherical shape of the ball mounts 138A, 138B and the oversize of the opening 146A, 146B (e.g., openings 146A, 146B are larger in diameter than the ball mounts 138A, 138B) accommodate rotational variance of the engine 200 (e.g., angled mount of the engine 200 relative to the vehicle frame 212). Further, the angled mount accounts for relative angling of the engine 200 as the jack rods 134A, 134B are iteratively rotated to support and/or lift the engine 200 relative to the vehicle frame 212. For example, to lift the engine level, the first jack rod 134A travels vertically and lifts a first side of the engine 200. Once level, the first jack rod 134A then travels further vertically to lift the first side of the engine 200 higher than the second side. Then the second jack rod 134B travels vertically to lift the second side of the engine 200 higher than the first side. This process repeats until the engine 200 is supported and/or lifted to a desired height relative to the vehicle frame 212.

Accordingly, the jack assemblies 18A, 18B are configured to support the engine block 206 of the vehicle 202 relative to the vehicle frame 212 by vertical movement of the ball mounts 138A, 138B into the couplers 14A, 14B and relative to the frame mount 16 engaged with the vehicle frame 212. The jack assemblies 18A, 18B are configured to lift the engine block 206 of the vehicle 202 relative to the frame 212 of the vehicle 202 by vertical movement of the ball mounts 138A, 138B in the couplers 14A, 14B and relative to the frame mount 16 engaged with the vehicle frame 212. Once supported and/or lifted, the engine 200 can be serviced (e.g., removing fly wheel housing, removing transmission, etc.).

Figure 3A:
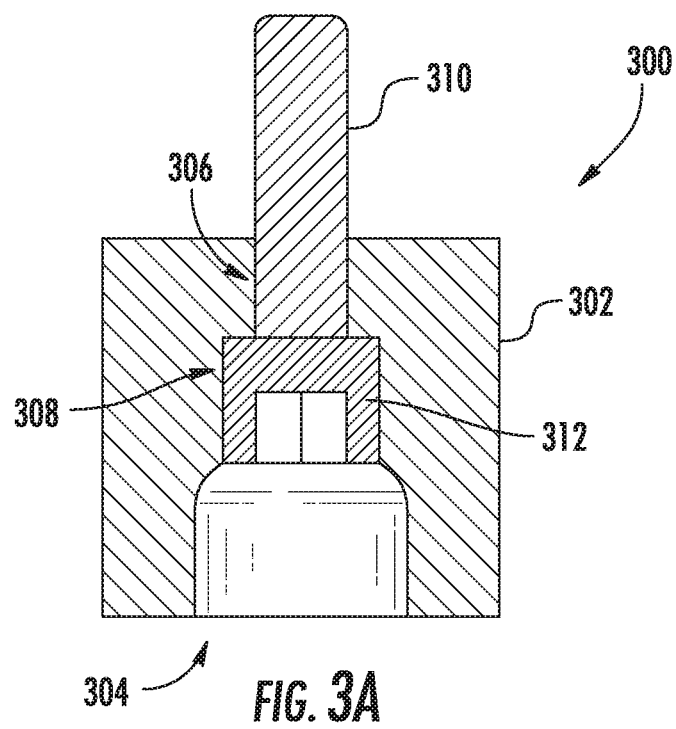
FIG. 3A is a cross-sectional side view of an alternative embodiment of a coupler of FIGS. 1A-2E.

FIG. 3A is a cross-sectional side view of an alternative embodiment of the coupler of FIGS. 1A-2E. The coupler 300 includes a receptacle 302 with an opening 304 at a bottom to receive the ball mounts 138A, 138B of the jack rods 134A, 134B of the jack assemblies 18A, 18B. The receptacle 302 further includes a through hole 306 and a countersink 308 to receive a fastener 310 therein, such that the head 312 of the fastener 310 is positioned in the countersink 308.

Figure 3B:
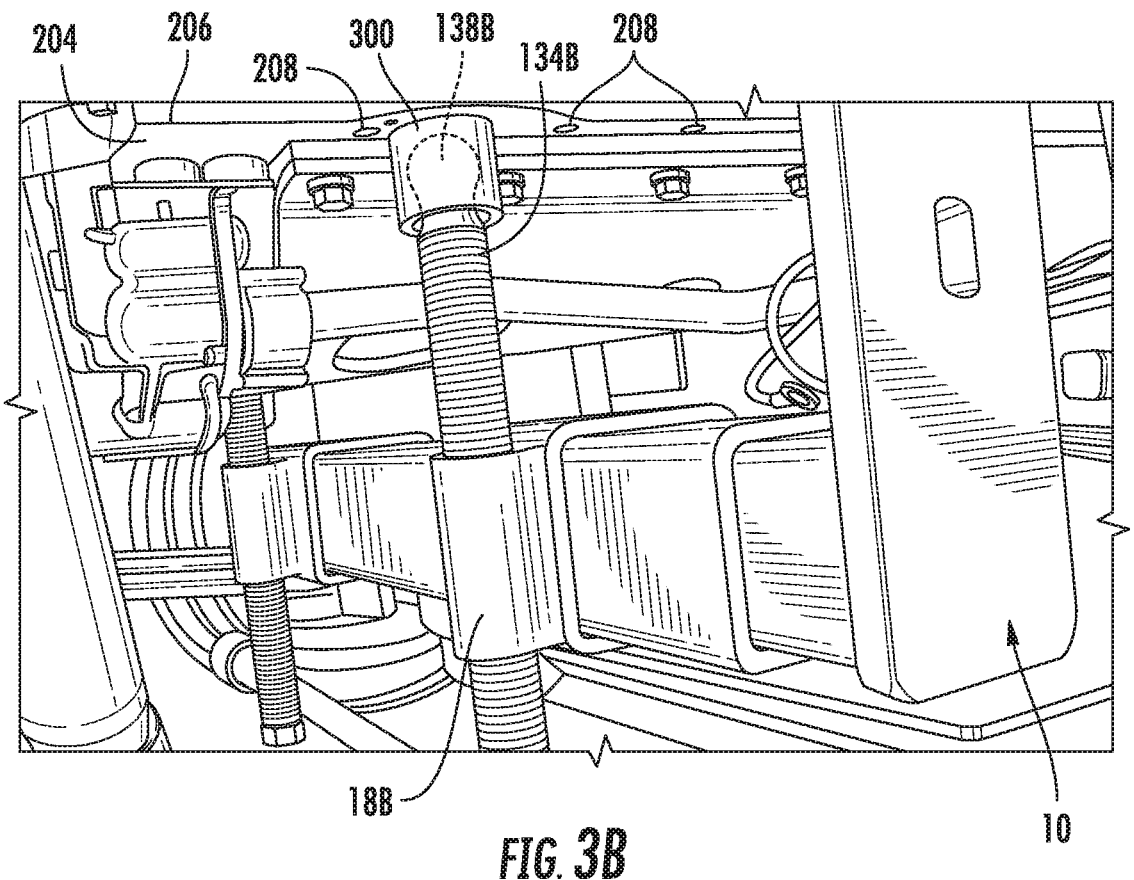
FIG. 3B is a perspective view of the engine support system of FIGS. 1A-2E engaged with the coupler of FIG. 3A.
Figure 4:
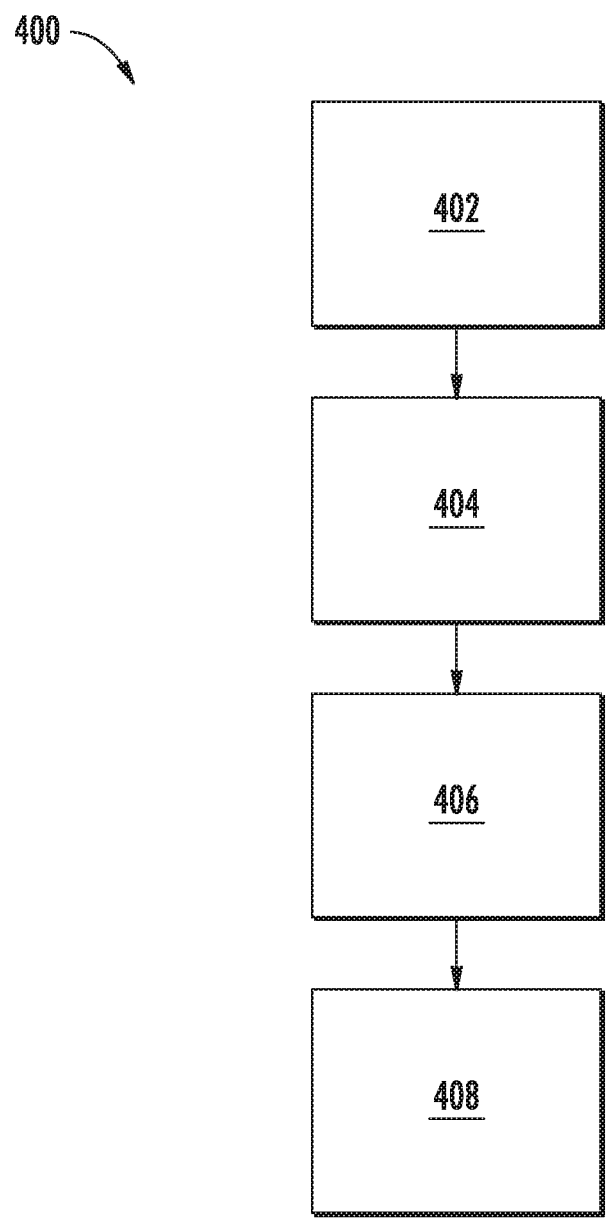
FIG. 4 is a flowchart illustrating a method of supporting an engine of a vehicle using the engine support system of FIGS. 1A-3B.

FIG. 3B is a perspective view of the engine support system 10 of FIGS. 1A-2E engaged with the coupler 300 of FIG. 3A. In particular, the ball mount 138B of the second jack rod 134B of the second jack assembly 18B is inserted into the coupler 300.

The coupler 300 is universal and only requires one threaded hole 208 in the engine block 206. In other words, for example, the first coupler includes a receptacle defining a through hole 306 (see FIG. 3A) configured to receive a fastener 310 (see FIG. 3A) to removably attach the first coupler 300 to a single threaded hole 208 at the underside 204 of the engine block 206 of the vehicle 202. Accordingly, compared to the coupler 14A, 14B, the coupler 300 increases the flexibility and modularity of mounting.

FIG. 6 is a flowchart 400 illustrating a method of supporting an engine 200 of a vehicle 202 using the engine support system 10 of FIGS. 1A-3B. Step 402 includes suspending a frame mount 416 of an engine support system 10 across a frame 212 of a vehicle 202 beneath an engine block 206 of the vehicle 202 by moving a first arm 102A attached to a first end of a telescoping body 100 relative to a second arm 102B attached to a second end of the telescoping body 100 to an engaged orientation. In certain embodiments, the method further includes attaching a first clamping jaw 114A to the first arm 102A to position a portion of a first rail 210A of the frame 212 of the vehicle 202 between a first flange 110A of the first arm 102A and a first bracket 116A of the first clamping jaw 114A, and rotating a first clamping bolt 118A in a first threaded hole 128A of the first bracket 116A of the first clamping jaw 114A to clamp the portion of the first rail 210A of the frame 212 of the vehicle 202 between the first flange 110A and the first clamping bolt 118A.

In certain embodiments, the method further includes horizontally sliding a second collar 130B of a second jack assembly 18B of the engine support system 10 along the telescoping body 100 to align a ball mount 138B of a second jack rod 134B of the second jack assembly 18B with a second coupler 14B at the underside 204 of the engine block 206 of the vehicle 202. The method further includes engaging the second jack assembly 18B with the engine block 206 by vertically moving the second jack rod 134B of the second jack assembly 18B to insert the ball mount 138B of the second jack assembly 18B into the second coupler 14B of the engine block 206. The method further includes supporting the engine 200 of the vehicle 202 relative to the frame 212 of the vehicle 202 by vertically moving the second jack rod 134B of the second jack assembly 18B to insert the ball mount 138B of the second jack rod 134B of the second jack assembly 18B into the second coupler 14B at the underside 204 of the engine block 206.

Step 404 includes horizontally sliding a first collar 130A of a first jack assembly 18A of the engine support system 10 along the telescoping body 100 to align a ball mount 138A of a first jack rod 134A of the first jack assembly 18A with a first coupler 14A at an underside 204 of the engine block 206 of the vehicle 202. In certain embodiments, the method further includes attaching the first coupler 14A to the underside 204 of the engine block 206 of the vehicle 202.

Step 406 includes supporting an engine 200 of the vehicle 202 relative to the frame 212 of the vehicle 202 by vertically moving the first jack rod 134A of the first jack assembly 18A to insert the ball mount 138A of the first jack rod 134A of the first jack assembly 18A into the first coupler 14A at the underside 204 of the engine block 206. Step 408 includes lifting an engine 200 of the vehicle 202 relative to the frame 212 of the vehicle 202 by continued vertical movement of the first jack rod 134A of the first jack assembly 18A.

Those skilled in the art will recognize improvements and modifications to the preferred embodiments of the present disclosure. All such improvements and modifications are considered within the scope of the concepts disclosed herein and the claims that follow.

What is claimed is:

1. An engine support system for a vehicle, comprising:
    a frame mount comprising:
        a telescoping body comprising at least one inner sleeve and at least one outer sleeve configured to slide relative to the inner sleeve;
        a first arm at a first end of the telescoping body configured to releasably engage a first side of a frame of a vehicle; and
        a second arm at a second end of the telescoping body opposite the first end configured to releasably engage a second side of the vehicle frame;
    a first coupler configured to attach to an engine of the vehicle; and
    a first jack assembly, comprising:
        a first collar slidably coupled to the telescoping body and configured to move horizontally along the telescoping body; and
        a first jack rod coupled to the first collar and configured to move vertically relative to the first collar, the first jack rod comprising a body and a ball mount at an end of the body, the ball mount configured to insert into the first coupler at an underside of an engine block of the vehicle.

2. The engine support system of claim 1, further comprising the first coupler configured to removably attach to the underside of the engine block of the vehicle.

3. The engine support system of claim 1, wherein the first coupler is configured to removably attach to threaded holes configured to mount an oil drip pan to the underside of the engine block of the vehicle.

4. The engine support system of claim 1, wherein the first coupler includes a receptacle defining a through hole configured to receive a fastener to removably attach the first coupler to a single threaded hole at the underside of the engine block of the vehicle.

5. The engine support system of claim 1, wherein the first coupler includes a receptacle fixedly attached to a plate with a plurality of through holes, at least two of the plurality of through holes configured to align with at least two threaded holes at the underside of the engine block of the vehicle.

6. The engine support system of claim 1, wherein the at least one inner sleeve and the at least one outer sleeve each comprise a non-circular cross-section.

7. The engine support system of claim 1, wherein the telescoping body comprises a first inner sleeve fixedly attached to the first arm and a second inner sleeve fixedly attached to the second arm.

8. The engine support system of claim 1, wherein the first arm comprises a first flange configured to engage a first upper surface of a first rail of the vehicle frame and the second arm comprises a second flange configured to engage a second upper surface of a second rail of the vehicle frame.

9. The engine support system of claim 8,
wherein a first edge of the first flange of the first arm is tapered to increase a contact surface area with the first rail angled relative to a center axis of the vehicle; and
wherein a second edge of the second flange of the second arm is tapered to increase a contact surface area with the second rail angled relative to the center axis of the vehicle.

10. The engine support system of claim 8, wherein the frame mount further comprises:
a first clamping jaw removably attached to the first arm, the first clamping jaw comprising a first bracket and a first clamping bolt, the first bracket defining a first threaded hole, the first clamping bolt positioned in the first threaded hole and configured to move relative thereto to clamp a portion of the first rail between the first flange and the first clamping bolt; and
a second clamping jaw removably attached to the second arm, the second clamping jaw comprising a second bracket and a second clamping bolt, the second bracket defining a second threaded hole, the second clamping bolt positioned in the second threaded hole and configured to move relative thereto to clamp a portion of the second rail between the second flange and the second clamping bolt.

11. The engine support system of claim 1, wherein the first jack assembly is configured to lift the engine block of the vehicle relative to the vehicle frame by vertical movement of the jack rod relative to the frame mount engaged with the vehicle frame with the ball mount in the first coupler.

12. The engine support system of claim 11, wherein the first jack assembly further comprises a first threaded cuff fixedly attached to an outer surface of the first collar and offset from a center of the first collar along a center axis of the first collar.

13. The engine support system of claim 1, wherein the body of the first jack rod is threaded.

14. The engine support system of claim 13, wherein the first jack assembly further comprises a first threaded cuff attached to the first collar, the first jack rod positioned within the threaded cuff.

15. The engine support system of claim 1, wherein the first collar comprises a non-circular cross-section.

16. The engine support system of claim 1,
wherein the first jack assembly is configured to engage the first coupler at a first side of the engine block of the vehicle;
wherein the engine support system further comprises a second jack assembly configured to engage a second coupler at a second side of the engine block of the vehicle, comprising:
a second collar slidably coupled to the telescoping body and configured to move horizontally along the telescoping body; and
a second jack rod threadably coupled to the second collar and configured to move vertically relative to the second collar, the second jack rod comprising a second body and a second ball mount at an end of the second body, the second ball mount configured to insert into the second coupler at the underside of the engine block of the vehicle.

17. A method of supporting an engine of a vehicle, comprising:
suspending a frame mount of an engine support system across a frame of a vehicle beneath an engine block of the vehicle by moving a first arm attached to a first end of a telescoping body relative to a second arm attached to a second end of the telescoping body to an engaged orientation;
horizontally sliding a first collar of a first jack assembly of the engine support system along the telescoping body to align a ball mount of a first jack rod of the first jack assembly with a first coupler at an underside of the engine block of the vehicle; and
supporting an engine of the vehicle relative to the vehicle frame by vertically moving the first jack rod of the first jack assembly to insert the ball mount of the first jack rod of the first jack assembly into the first coupler at the underside of the engine block.

18. The method of claim 17, further comprising lifting an engine of the vehicle relative to the vehicle frame by continued vertical movement of the first jack rod of the first jack assembly.

19. The method of claim 17, further comprising attaching the first coupler to the underside of the engine block of the vehicle.

20. The method of claim 17, further comprising:
attaching a first clamping jaw to the first arm to position a portion of a first rail of the vehicle frame between a flange of the first arm and a first bracket of the first clamping jaw; and
rotating a first clamping bolt in a first threaded hole of the first bracket of the first clamping jaw to clamp the portion of the first rail of the vehicle frame between the first flange and the first clamping bolt.

\* \* \* \* \*